United States Patent
Williams et al.

(10) Patent No.: US 10,776,338 B2
(45) Date of Patent: Sep. 15, 2020

(54) DATA AGGREGATION DATA STRUCTURE

(71) Applicant: Hewlett-Packard Development Company, L.P., Houston, TX (US)

(72) Inventors: Kevin Williams, San Diego, CA (US); Amit Kumar Singh, Houston, TX (US); Gaurav Roy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 240 days.

(21) Appl. No.: 15/940,625

(22) Filed: Mar. 29, 2018

(65) Prior Publication Data
US 2019/0303467 A1    Oct. 3, 2019

(51) Int. Cl.
*G06F 16/22*    (2019.01)
*G06F 16/28*    (2019.01)
*G06F 16/2458*    (2019.01)

(52) U.S. Cl.
CPC ........ *G06F 16/2282* (2019.01); *G06F 16/221* (2019.01); *G06F 16/2477* (2019.01); *G06F 16/285* (2019.01)

(58) Field of Classification Search
CPC ............. G06F 16/2282; G06F 16/2477; G06F 16/285; G06F 16/221
See application file for complete search history.

(56) References Cited

U.S. PATENT DOCUMENTS

| | | | |
|---|---|---|---|
| 7,149,736 B2 | 12/2006 | Chkodrov et al. | |
| 7,831,617 B2 | 11/2010 | Bruckner et al. | |
| 9,430,519 B1* | 8/2016 | Cai | G06F 16/24556 |
| 2008/0263000 A1 | 10/2008 | West et al. | |
| 2008/0270363 A1* | 10/2008 | Hunt | G06F 16/2462 |
| 2008/0288889 A1* | 11/2008 | Hunt | G06Q 30/02 715/810 |
| 2008/0294996 A1* | 11/2008 | Hunt | G06Q 30/02 715/739 |
| 2010/0042645 A1* | 2/2010 | Bakalash | G06F 16/2455 707/607 |
| 2014/0298483 A1* | 10/2014 | Kato | H04L 63/20 726/27 |
| 2015/0088885 A1* | 3/2015 | Hopeman, IV | G06F 16/221 707/737 |

FOREIGN PATENT DOCUMENTS

WO    WO-2013012400    1/2013

\* cited by examiner

*Primary Examiner* — Shahid A Alam
(74) *Attorney, Agent, or Firm* — Perry + Currier Inc (57) ABSTRACT

A system is provided including a memory in communication with a processor. The memory is to store a data source comprising source data. The processor is to store in a row of a table: a source identifier of the data source, a data category value, and an aggregation identifier of an aggregation operation. The processor is also to execute the aggregation operation against the source data based on the data category value to obtain a measure related to the source data. In addition, the processor is to store the measure in the row, and output the table.

8 Claims, 6 Drawing Sheets

| deviceid (210) | companyname (215) | devicetype (220) | months_in_service (225) | date (230) |
|---|---|---|---|---|
| 1 | acme bolts | computer | 2 | 2017-12-01 |
| 2 | abc fasteners | phone | 4 | 2017-12-02 |
| 3 | abc fasteners | computer | 1 | 2017-12-02 |
| 4 | acme bolts | phone | 7 | 2017-12-03 |
| 5 | acme bolts | computer | 1 | 2017-12-04 |
| 6 | twisty ties | computer | 3 | 2017-12-04 |
| 7 | twisty ties | phone | 15 | 2017-12-04 |

235

| source_identifier (240) | category (245) | aggregation (250) | measure (255) | target_date (260) |
|---|---|---|---|---|
| device.companyname | acme bolts | count(deviceid) | 2 | 2017-12-03 |
| device.companyname | abc fasteners | count(deviceid) | 2 | 2017-12-03 |
| device.devicetype | computer | count(deviceid) | 2 | 2017-12-03 |
| device.devicetype | phone | count(deviceid) | 2 | 2017-12-03 |
| device.devicetype | acme bolts, computer | count(deviceid) | 1 | 2017-12-03 |
| device.devicetype | acme bolts, phone | count(deviceid) | 1 | 2017-12-03 |
| device.devicetype | abc fasteners, computer | count(deviceid) | 1 | 2017-12-03 |
| device.devicetype | abc fasteners, phone | count(deviceid) | 1 | 2017-12-03 |
| device.months_in_service | acme bolts | average(months_in_service) | 4.5 | 2017-12-03 |
| device.months_in_service | abc fasteners | average(months_in_service) | 2.5 | 2017-12-03 |

| deviceid (210) | companyname (215) | devicetype (220) | months_in_service (225) | date (230) |
|---|---|---|---|---|
| 1 | acme bolts | computer | 2 | 2017-12-01 |
| 2 | abc fasteners | phone | 4 | 2017-12-02 |
| 3 | abc fasteners | computer | 1 | 2017-12-02 |
| 4 | acme bolts | phone | 7 | 2017-12-03 |
| 5 | acme bolts | computer | 1 | 2017-12-04 |
| 6 | twisty ties | computer | 3 | 2017-12-04 |
| 7 | twisty ties | phone | 15 | 2017-12-04 |

305

| source_identifier (240) | category (245) | aggregation (250) | measure (255) | target_date (260) |
|---|---|---|---|---|
| device.companyname | acme bolts | count(deviceid) | 3 | 2017-12-04 |
| device.companyname | abc fasteners | count(deviceid) | 2 | 2017-12-04 |
| device.companyname | twisty ties | count(deviceid) | 2 | 2017-12-04 |
| device.devicetype | computer | count(deviceid) | 4 | 2017-12-04 |
| device.devicetype | phone | count(deviceid) | 3 | 2017-12-04 |
| device.devicetype | acme bolts, computer | count(deviceid) | 2 | 2017-12-04 |
| device.devicetype | acme bolts, phone | count(deviceid) | 1 | 2017-12-04 |
| device.devicetype | abc fasteners, computer | count(deviceid) | 1 | 2017-12-04 |
| device.devicetype | abc fasteners, phone | count(deviceid) | 1 | 2017-12-04 |
| device.devicetype | twisty ties, computer | count(deviceid) | 1 | 2017-12-04 |
| device.devicetype | twisty ties, phone | count(deviceid) | 1 | 2017-12-04 |
| device.months_in_service | acme bolts | average(months_in_service) | 3.33 | 2017-12-04 |
| device.months_in_service | abc fasteners | average(months_in_service) | 2.5 | 2017-12-04 |
| device.months_in_service | twisty ties | average(months_in_service) | 9 | 2017-12-04 |

DATA AGGREGATION DATA STRUCTURE

BACKGROUND

Data may be collected and organized in data structures stored in computer-readable memory. These data structures may store large volumes of data collected over time. Computers may be used to retrieve and process the data stored in the data structures.

DETAILED DESCRIPTION

Increasing volumes of data are being generated, collected, and processed. Some examples of sources of such data include connected sensors, connected objects or things within an Internet-of-Things scheme, and connected devices within a Device-as-a-Service (DaaS) ecosystem. In a DaaS ecosystem a DaaS provider provides the use of devices, such as computing devices, to customers. The DaaS provider may retain responsibility for the devices, for example to update and/or maintain the devices.

The DaaS provider may collect data from the devices and/or customers within the DaaS ecosystem to assist with maintaining the devices and their performance. Such data about the devices and customers may be collected over time in one or multiple data sources. As the number of devices and customers increase, and the data collection times lengthen, the volume of data stored in the data sources may increase.

In order to obtain insights from the data stored in the data sources, the data may be queried to obtain aggregate measures related to the data. For example, an aggregate measure may comprise the number of devices used by a given customer in a DaaS ecosystem. Collecting and maintaining a predetermined set of aggregate measures together may provide a centralized resource for obtaining data-driven insights about the DaaS ecosystem.

Figure 1:
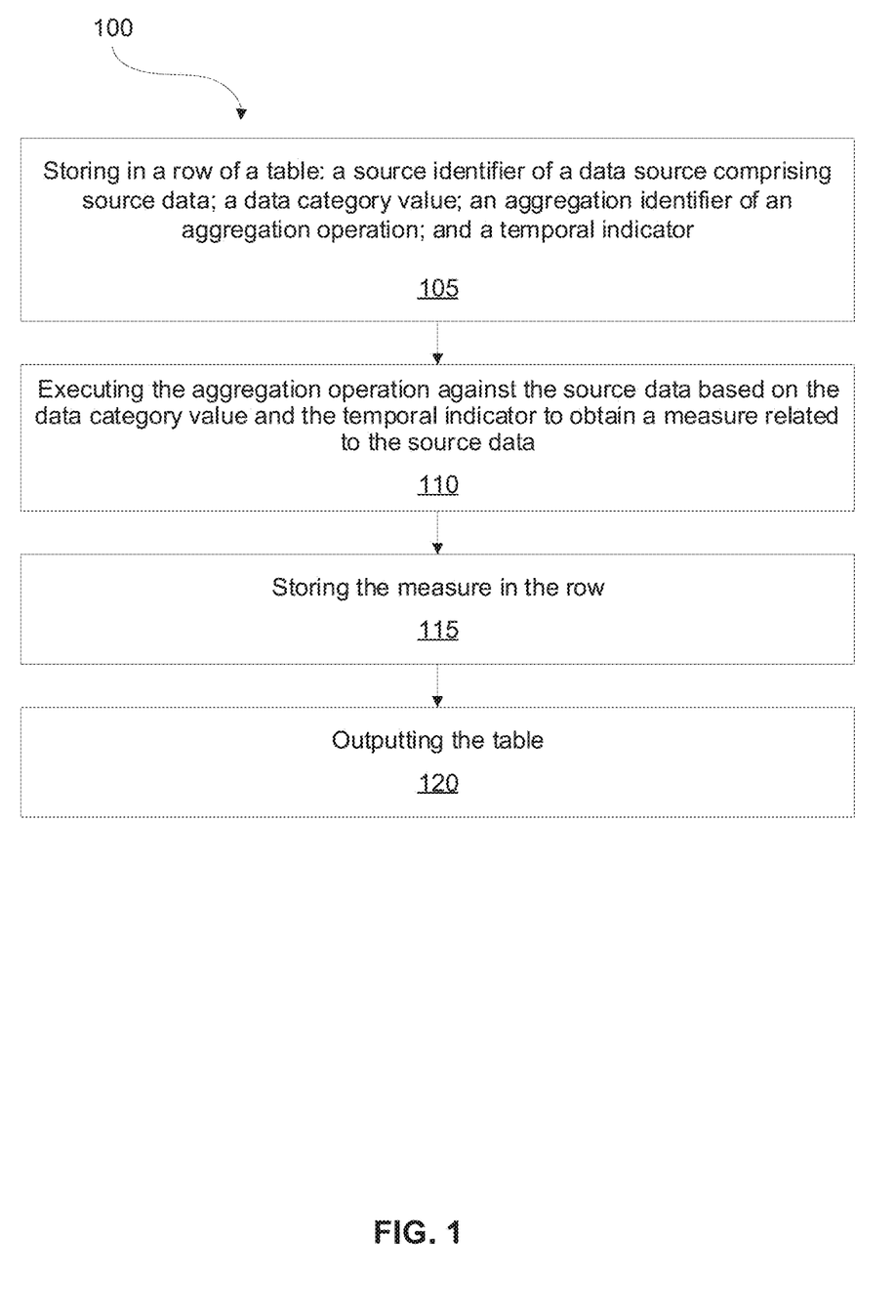
FIG. 1 shows a flowchart of an example method that may be used to generate a data aggregation data structure.

FIG. 1 shows a flowchart of an example method 100 that may be used to generate a data aggregation data structure, such as a data aggregation data table, henceforth referred to interchangeably as "aggregation data structure" and "aggregation data table" respectively. At box 105 of method 100, the following may be stored in a row of a table: a source identifier of a data source comprising source data, a data category value, an aggregation identifier of an aggregation operation, and a temporal indicator.

In some examples, the data source may comprise a data structure that stores the source data. For example, the data source may comprise a data table that stores data about customers and devices that are part of a DaaS ecosystem. Moreover, in some examples the data category may refer to the type of data stored in the data source. For example, data categories may include device type and company name. The data category values may in turn comprise the values associated which a data category. For example, "computer" and "phone" may be two different data category values associated with the "device type" data category.

The aggregation operation may comprise an operation on, examination of, or calculation based on the source data that reveals an aggregate property of all or a portion of the source data. For example, "count" may be an aggregation operation that reveals the number of the instances of the object being counted. Other examples of aggregation operations include maximum, minimum, sum, average, variance, standard deviation, and the like.

The aggregation identifier may comprise a syntactic or other representation of an aggregation operation. For example, when a database query language is used to implement the aggregation operation, the aggregation identifier may comprise a database query syntax associated with the aggregation operation. Moreover, if for example the database query language comprises Structured Query Language (SQL), the aggregation identifiers may comprise COUNT( ), MAX( ), MIN( ), SUM( ), AVG( ), VAR( ), STD( ), and the like, comprising respectively the SQL syntax for count, maximum, minimum, sum, average, variance, standard deviation aggregation operations.

In some examples, the temporal indicator may comprise an indication of date and/or time.

Returning to method 100, at box 110 the aggregation operation may be executed against all or a portion of the source data based on the data category value and the temporal indicator to obtain a measure related to the source data. The measure may comprise a Boolean indicator, a number, or another alphanumeric string. For example, if the aggregation operation comprises the count operation, the data category value comprises "phone", and the temporal indicator comprises Mar. 1, 2018 in the DaaS context, then upon executing the aggregation operation the occurrences of phones in the source data up to and including on March 1 will be counted, and the count returned as the measure.

Furthermore, at box 115 the measure may be stored in the row of the table. This in turn may associate the measure with the source identifier, the data category value, the aggregation identifier, and the temporal indicator based on which the measure was obtained.

Moreover, at box 120 the table may be output. To output the table, the table may be stored in a memory, sent to an output terminal, communicated to another component or to another system, or the like. In some examples, before completing box 120, boxes 105, 110, and 115 may be repeated to add additional rows to the table, the additional rows having their corresponding source identifiers, data category values, aggregation identifiers, temporal indicators, and measures. The output table is an example of a data aggregation data structure.

In some examples, the source identifier, data category value, aggregation identifier, temporal indicator, and measure may be stored and associated with one another in a data structure other than a table. In such examples, method 100 may output this other data structure instead of the table.

Furthermore, in some examples the data source may comprise a data table having a table identifier. The table identifier may comprise a table name. The data table may in turn comprise a column, and the column may have a column identifier such as a column name. In such examples, the source identifier may comprise the table identifier and the column identifier. For example, the source identifier may be formatted as "tablename.columnname".

It is contemplated that some formatting or other modifications may be made in forming the source identifier from the table and column identifiers. For example, spaces in the table and column identifiers may be removed when those identifiers are incorporated in the source identifier. In other examples, the source identifier may have a different content and/or be formatted differently than "tablename.columnname". In addition, in some examples the source identifier may comprise a table identifier, but not a column identifier.

Moreover, in some examples the data category value may comprise a value from the column of the data table. For example, the data table may comprise a column having the name "devicetype", which column lists different devices such as "computer", "phone", and the like. In such examples the data category value may comprise "phone", which value may be selected from the "devicetype" column of the data table.

In addition, in some examples the data source may comprise an additional column storing additional values. In such examples, the data category value may further comprise an additional value from the additional column. For example, if the data table comprises an additional "companyname" column storing additional company name values such as "acme bolts", "abc fasteners", and the like, then the data category value many comprise "acme bolts" in addition to "phone".

In examples where the data category value comprises values from multiple columns of the data table, the aggregation may be performed taking into account or based on the multiple values of the data category value. For example, where the data category value comprises both "acme bolts" and "phone", an example count aggregation operation may return as the measure the number of phones associated with the acme bolts company as recorded in the source data table.

In other examples, the data category value may comprise more than one value selected from the same column of the data table. For example, the data category value may comprise "computer" as well as "phone" from the "devicetype" column of the data table. In such an example, the aggregation operation would be performed or executed based on both "computer" and "phone". For example, a count aggregation operation would count and return as the measure the combined number of the phones and computers listed in the source data table. Moreover, it is contemplated that the data category value may comprise one, two, three, or a larger number of values selected from one, two, three, or a larger number of the columns of the source data table.

Furthermore, in some examples the temporal indicator may comprise a target date, and the aggregation operation may be executed against a subset of the source data having an associated date no later than the target date. When the associated dates represent the collection or validity dates or currency of the data in the data source, the target date may qualify the measure to indicate the latest date up to which source data was taken into account in obtaining the measure.

In other examples, the target date may represent the associated date of the source data taken into account in obtaining the measure. In other words, in such examples, source data having an associated date before or after the target date would not be used in obtaining the measure. Such a target date may indicate the date for which the measure was obtained and/or for which the measure is current or valid.

Figure 2:
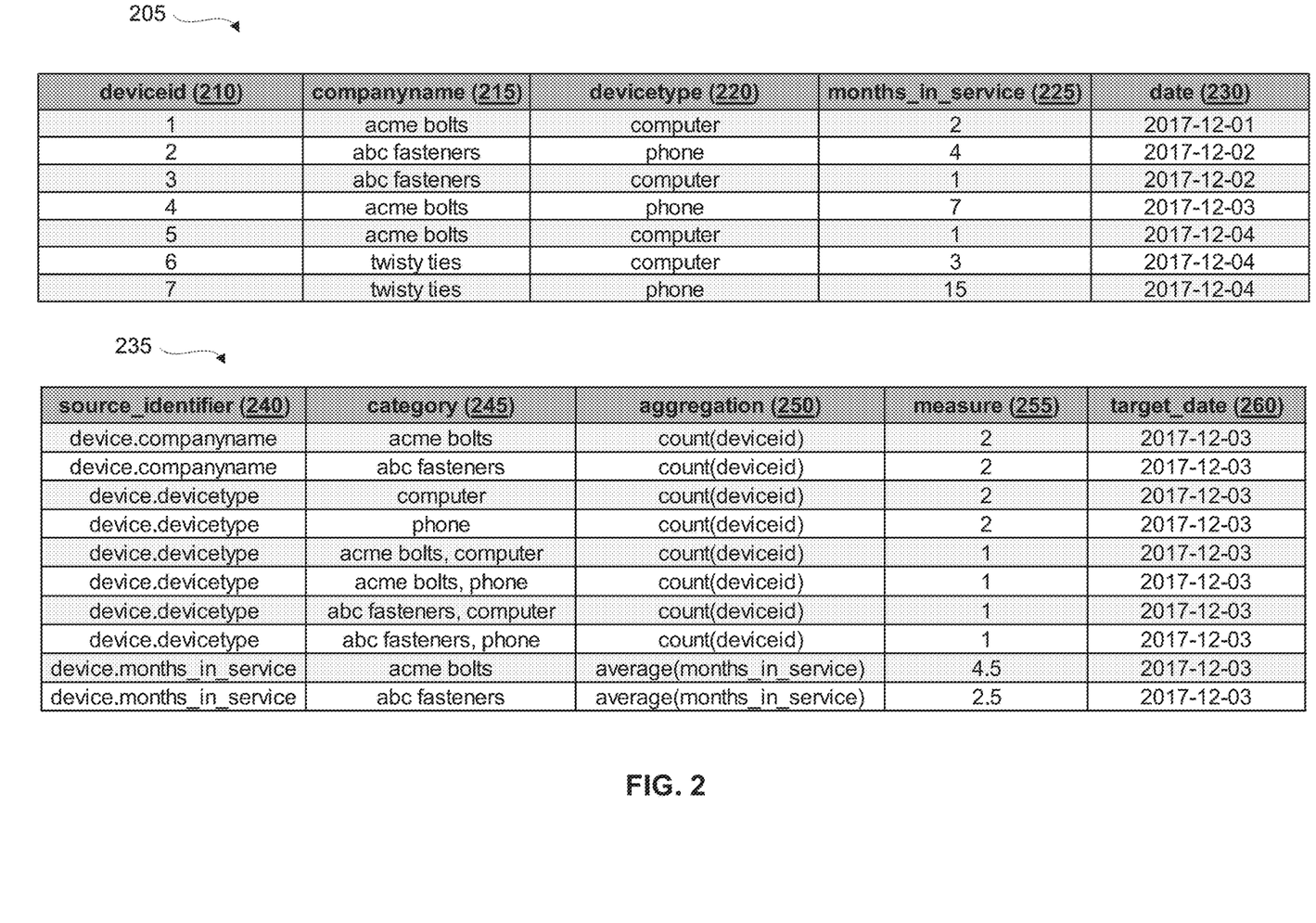
FIG. 2 shows example data tables.

FIG. 2 shows example data tables. Some aspects of the example methods disclosed herein will be described with reference to the example tables shown in FIG. 2. The reference to the tables of FIG. 2 is for demonstrative purposes, and the methods disclosed herein are not limited to or by the example data values or data structures shown in FIG. 2.

Table 205, shown in FIG. 2, is an example data source. Table 205 comprises columns named deviceid 210, companyname 215, devicetype 220, months_in_service 225, and date 230. While not shown in FIG. 2, table 205 may have a table name "device". Table 205 may include data related to a DaaS ecosystem such as a listing of customers "acme bolts", "abc fasteners", and "twisty ties", and the device types "computer" and "phone" for those customers. A value stored in the column months_in_service 225 may indicate the number of months that the corresponding device has been in service as of the date indicated in the column date 230.

Table 235 is an example data aggregation data table. Table 235 comprises columns named source_identifier 240, category 245, aggregation 250, measure 255, and target_date 260. Table 235 may be compiled and output using method 100 and/or the other methods described herein. Referring to the first row of table 235 directly below the header row, source identifier "device.companyname" may be stored in the first row. The "device" in "device.companyname" refers to the name of source data table 205. Moreover, the "companyname" in "device.companyname" refers to the name of column companyname 215 of table 205. In this manner, source identifier "device.companyname" indicates the data source, i.e. "device" table 205 and column companyname 215 of table 205.

Continuing to refer to the first row of table 235, in column category 245 the data category value "acme bolts" is stored, which value is from column companyname 215 of table 205. Moreover, column aggregation 250 stores aggregation identifier "count( . . . )", which is the SQL syntax for the count aggregation operation.

In addition, column target date 260 of table 235 stores the temporal indicator 2017-12-03, which indicates that the count aggregation operation is to be executed against the subset of the source data in table 205 having an associated date in column date 230 no later than 2017-12-03. Next, aggregation operation count may be executed against source data indicated by source identifier "device.companyname" to look for instances of data category value "acme bolts" which have an associated date no later than 2017-12-03. Two such instances are counted and the number two is obtained as the measure and stored in the first row in column measure 255.

Referring to the fifth row of table 235 down from the header row, table 235 shows two values stored in the fifth row in column category 245, "acme bolts" and "computer". As such, when the count operation is executed, the measure obtained is the number of instances, i.e. rows, in table 205 containing both "acme bolts" and "computer", and dated no later than 2017-12-03. There is only one such instance, and the number one is obtained and stored in the fifth row as the measure.

While the source identifier in the fifth row indicates "device.devicetype", it is contemplated that in some examples, not shown, the source identifier may also comprise a reference to column companyname 215 of table 205 to indicate that both columns companyname 215 and devicetype 220 of table 205 are relevant and are to be examined for the count aggregation operation.

Furthermore, referring to the bottom row of table 235, the average aggregation operation is indicated instead of the count operation. When executed, this average operation averages the months_in_service values for the devices associated with customer "abc fasteners" as indicated in column category 245. In addition, the average is calculated for source data dated no later than 2017-12-03 as indicated in column target_date 260. The average measure obtained is 2.5, which is stored in the bottom row, column measure 255 of table 235.

Moreover, while table 235 shows source identifiers referring to one source data table 205 named "device", it is contemplated that table 235 may comprise source identifiers referring to multiple data sources. In addition, while count and average aggregation identifiers are shown in FIG. 2, table 235 may comprise aggregation identifiers for aggregation operations other than count and average.

In addition, in some examples table 235 may comprise fewer, more, or different columns than those shown in FIG. 2. Moreover, table 235 may comprise more or fewer rows depending on the numbers of data sources, types of aggregations, and target dates that a designer or user of table 235 chooses to include in table 235. For example, referring to FIG. 3, a table 305 is shown, which is an example data aggregation data table. Table 305 has the same number of columns and the same column names as table 235.

Figure 3:
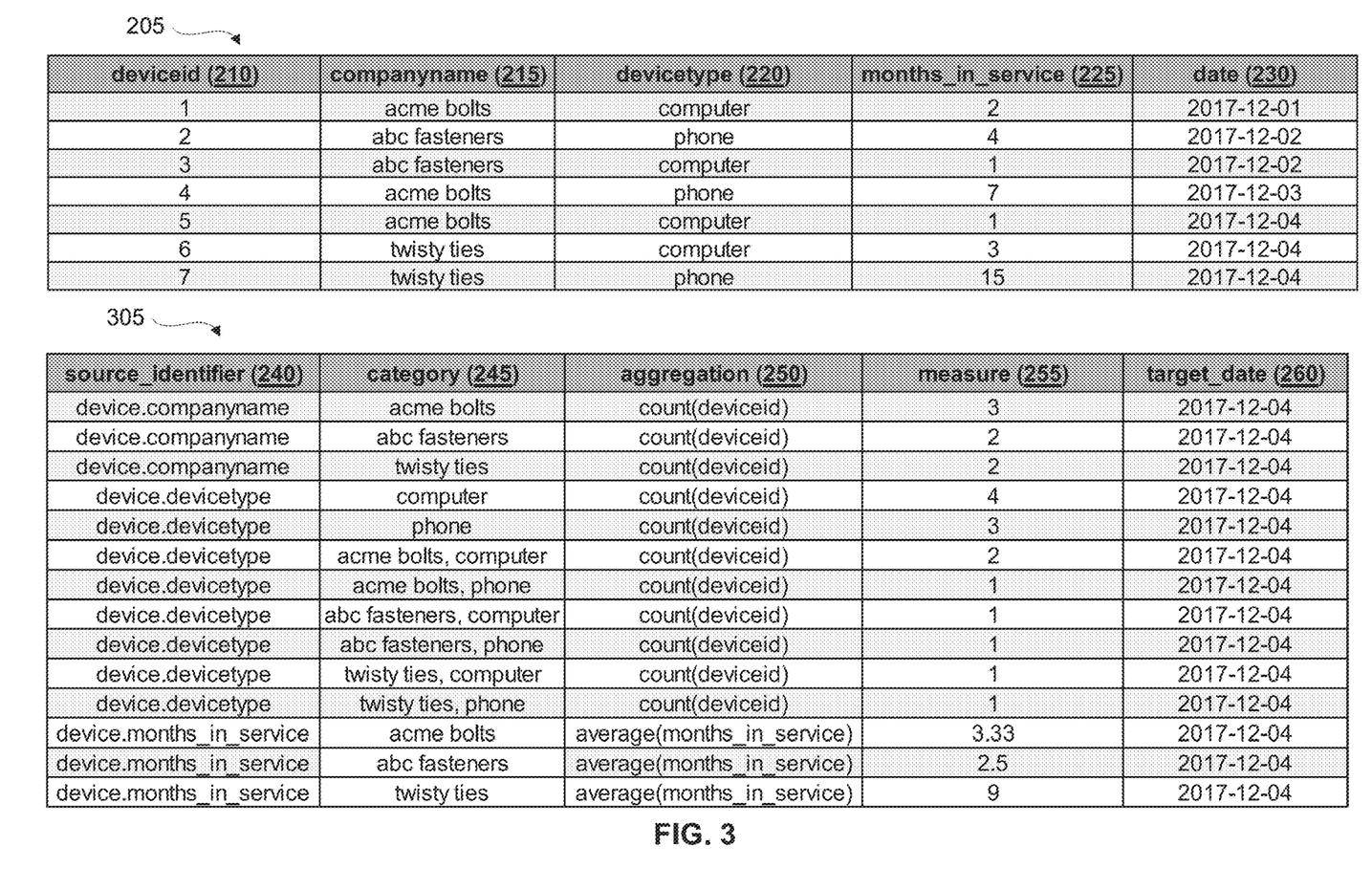
FIG. 3 shows further example data tables.

A primary difference between table 305 and table 235 is that the target date for table 304 is set to 2017-12-04, one day later than the target date for table 235. As such, the aggregation operations specified in table 305 are executed against a larger subset of the source data in table 205. In other words, the aggregation operations in table 305 are executed against table 205 source data up to and including 2017-12-04, whereas the aggregation operations in table 235 are executed against table 205 source data up to and including 2017-12-03.

Moreover, table 305 has additional rows for data category values comprising company name "twisty ties" which has related data in table 205 associated with date 2017-12-04. In some examples, the methods described herein may review the data source for new potential data category values when the data aggregation data table is generated or updated, and may add new rows to the aggregation data table to add aggregate measures for the new data category values. In other examples, whenever a given change is made to the source data, for example when a new customer is added, generation of an updated aggregation data table may be triggered in order to reflect the change in the source data in the aggregation data table.

In the context of FIG. 3 for example, when table 305 is generated or updated on 2017-12-04, the methods described herein may detect that company name "twisty ties" has been added to table 205, and may add additional rows to table 305 to provide aggregate measures based on data category value "twisty ties". In some examples, one or several rules may be implemented for adding new rows to the aggregation data table. For example, in the context of FIG. 3, an example rule may be that a new row is to be added to table 305 to ensure there is a separate row providing a count measure of the devices corresponding to each of the companies listed in the column companyname 215 of table 205, These companies may be customers in a DaaS ecosystem.

Furthermore, while FIGS. 2 and 3 show two separate data aggregation tables, table 235 for source data up to and including 2017-12-03 and a separate table 305 for source data up to and including 2017-12-04, it is contemplated that in some examples, tables 235 and 305 may be combined into one table. For example, the rows of table 305 may be added as additional rows to table 235. Rows for subsequent data aggregations tables may also be similarly added to table 235. In such examples, such a combined data aggregation table may provide a single, centralized time-series or historical record of the same or similar aggregate measures over time. This may in turn provide insight into changes over time of given aggregate measures related to the source data.

In some examples, the aggregation operations described herein may comprise operations that may be executed against or take in as their input multiple data values from the data source. When there is one valid data value for the aggregation operations to operate on, the aggregation operations may continue to apply and return valid measures as their input. For example, a count aggregation operation may return a valid count measure when there are multiple valid data values and also when there is one valid data value for the count operation to be executed against.

In some examples, the operations executed against the source data need not be limited to aggregation operations, and may comprise other queries or operations that may return or obtain a valid measure to be stored in the data aggregation data structure. When the operation being executed is not an aggregation operation, the data structure in which the corresponding measure is stored may be referred to as a data summarization data structure or a data query results data structure.

Data aggregation data structures such as tables 235 and 305 may be used in the context of a DaaS ecosystem, to reduce the computational resources used to provide predetermined aggregate measures related to the DaaS ecosystem, collected into one data structure, and trackable over time as historical time-series data. The reduction in computational resources may be obtained by executing the aggregation operations and storing the resulting measures in the aggregation data structure for subsequent review. In some examples, the aggregate measured may be stored for a review period, for example quarterly. Then, when the aggregate measures are to be reviewed subsequently during the review period, the measures may be simply retrieved from memory instead of re-executing or re-computing the aggregation operations to obtain the aggregate measures every time the aggregate measures are to be reviewed. Avoiding or reducing the re-executing or re-computing of the aggregation operations may in turn reduce the use of computational resources such as processing power and processing time.

At the start of the next review period, the aggregation data structures may be updated to reflect changes in the source data. Such updating may comprise re-executing an aggregation operation to update the resulting measures, or adding and executing new aggregation operations as would be the case, for example, when new rows are added to an aggregation data table.

In addition, the aggregation data structures described herein may be portable across multiple platforms because they may use simple data structures and aggregation operations that are commonly supported by many platforms. For example, table data structures and aggregation operations such as count, including the corresponding aggregation identifier query syntax, are supported by platforms that support SQL, and as such may be portable between the many database and other data storage and analysis platforms that support SQL.

Figure 4:
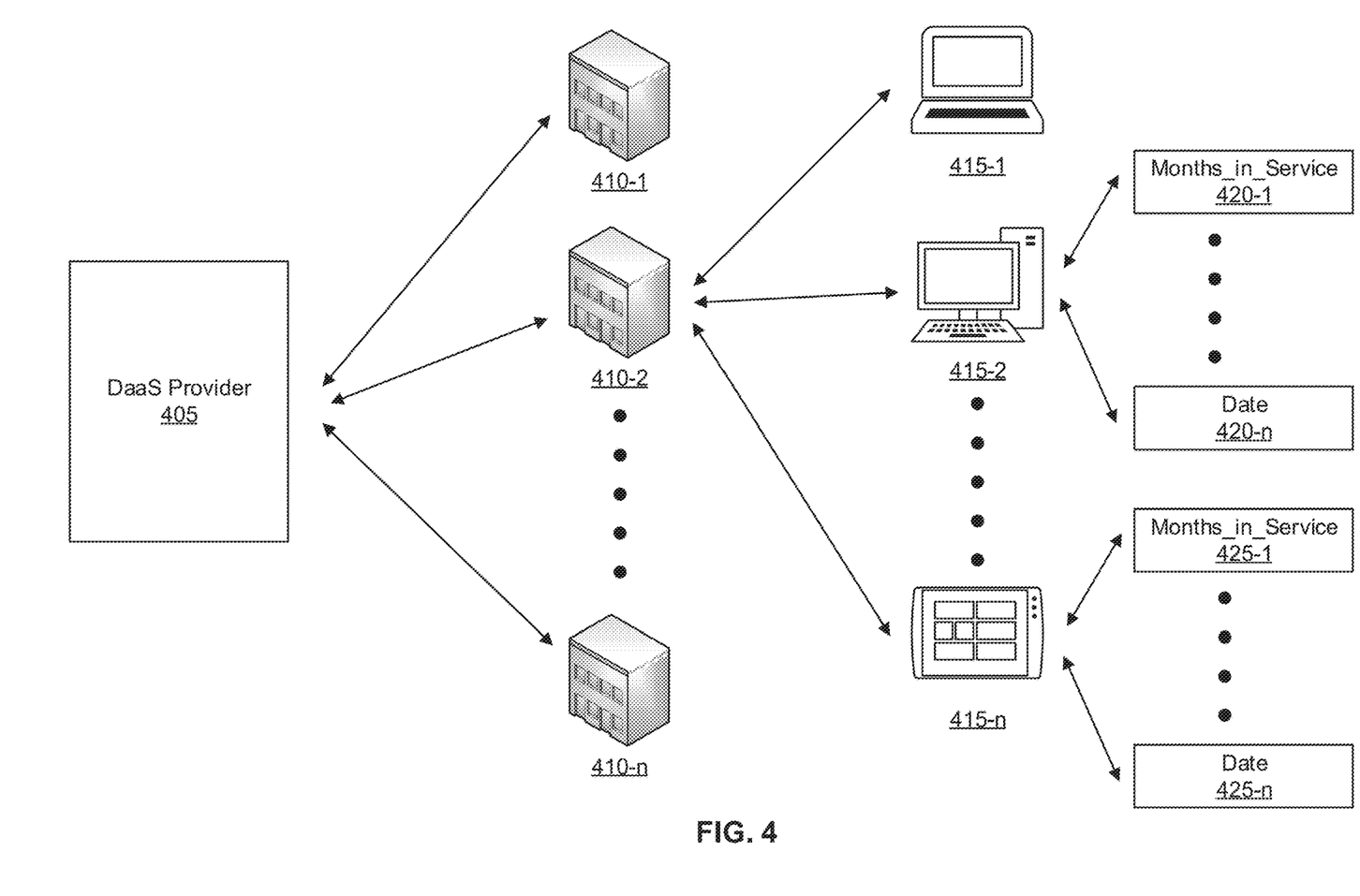
FIG. 4 shows a schematic representation of an example Device-as-a-Service ecosystem.

FIG. 4 shows a schematic representation of an example DaaS ecosystem comprising a DaaS provider 405, which serves customers 410-1, 410-2 to 410-*n*, collectively referred to as customers 410.

The DaaS provider 405 may provide to a customer a number of devices 415-1, 415-2 to 415-*n*, collectively referred to as devices 415. While devices are shown in FIG. 4 only for customer 410-2, the other customers may also be provided with devices. Moreover, while devices 415 are shown as being connected to DaaS provider 405 through customer 410-2, it is contemplated that devices 415 may be in direct communication with DaaS provider 405.

A device may have a number of associated data values, which may be static or dynamic over time. For example, device 415-2 may have a number of associated data values including months_in_service 420-1 to a date 420-$n$ when the months_in_service 420-1 or other data values for device 415-2 are reported. Similarly, device 415-$n$ may have a number of associated data values including months_in_service 425-1 to date 425-$n$. While not shown in FIG. 4, other devices such as device 415-1 may also have associated data values.

DaaS provider 405 may collect time-series data on device data values to monitor the performance of and diagnose problems relating to devices 415. Moreover, DaaS provider 405 may also collect and monitor data relating to customers 410 such as the customers' company name and the like. The methods described herein may provide aggregation data structures, such as an aggregation data table, that may be used to pre-execute and store, compile from multiple data sources, centralize, and track over time aggregate measures related to the data values associated with the DaaS ecosystem. As such, the methods described herein may allow for computing or obtaining, storing, and tracking aggregate measures in the context of a DaaS ecosystem using computational resources reduced compared to using separate or disparate execution of ad hoc aggregation operations every time an aggregate measure is obtained.

Figure 5:
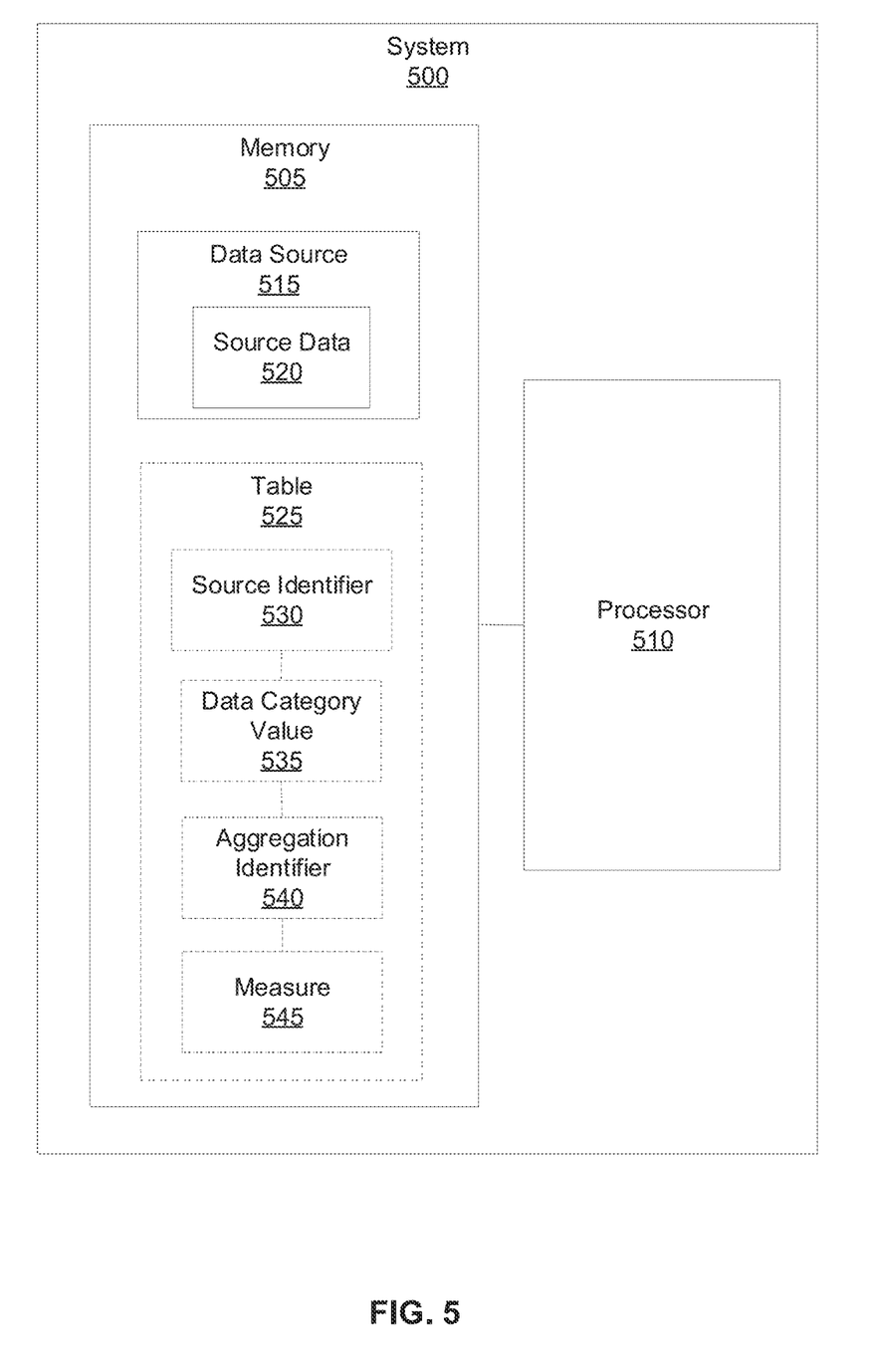
FIG. 5 shows a block diagram of an example computing system.

Turning now to FIG. 5, a system 500 is shown which may be used to generate an aggregation data structure such as an aggregation data table. System 500 comprises a memory 505 in communication with a processor 510. Processor 510 may include a central processing unit (CPU), a graphics processing unit (GPU), a microcontroller, a microprocessor, a processing core, a field-programmable gate array (FPGA), or similar device capable of executing instructions. Processor 510 may cooperate with the memory 505 to execute instructions.

Memory 505 may include a non-transitory machine-readable storage medium that may be an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions. In some example systems, memory 505 may include a database.

Memory 505 may store a data source 515 which in turn contains source data 520. Processor 510 may store in a row of a table 525 a source identifier 530 of data source 515, a data category value 535, and an aggregation identifier 540 of an aggregation operation. Table 525 may be similar to the aggregation data tables described in relation to the methods described herein and to FIGS. 1-3. Moreover, source identifier 530, data source 515, data category value 535, aggregation identifier 540, and the aggregation operation may also be similar to the source identifiers, data sources, data category values, aggregation identifiers, and aggregation operations described in relation to the methods described herein and to FIGS. 1-3.

Processor 510 may further execute the aggregation operation against all or a portion of source data 520 based on data category value 535 to obtain a measure 545 related to source data 520. Execution of the aggregation operation and measure 545 may be similar to those described in relation to the methods described herein and to FIGS. 1-3. Processor 510 may then store measure 545 in the row of table 525. Moreover, processor 510 may then output table 525, for example by storing table 525 in memory 505 or another storage inside and/or outside of system 500, by sending table 525 to an output terminal, by sending table 525 to another system, and the like.

In FIG. 5, table 525 and its components are shown in dashed lines to signify that while these components may be stored in memory 505 of system 500, in some examples table 525 and its components may be stored outside system 500 or outside memory 505 in system 500. Furthermore, in some examples, data source 515 may not be stored in memory 505, and may be stored outside system 500 or outside memory 505 in system 500.

In some examples, processor 510 further stores in the row of table 525 a temporal indicator, not shown in FIG. 5. Processor 510 may also execute the aggregation operation against source data 520 further based on the temporal indicator. In some examples, the temporal indicator may comprise a date or a time. Moreover, in some examples the temporal indicator may comprise a target date. The processor 510 may in turn execute the aggregation operation against a subset of source data 520 having an associated date no later than the target date, for example in a manner similar to that described in relation to the methods described herein and to FIGS. 1-3.

In examples where measure 545 is obtained by executing the aggregation operation based on data category value 535 but not based on the temporal identifier, measure 545 may be obtained by executing the aggregation operator against all relevant source data available at the time of execution of the aggregation operation.

In other examples, in the absence of a specified temporal indicator, the aggregation operation may be executed against a current portion of source data 520. In some examples, the current portion of source data 520 may comprise a portion of source data 520 which is associated with a date within a given time window of the time of execution of the aggregation operation. For example, the current portion may comprise a portion of source data 520 that has a currency or collection date within a day or a week of the execution of the aggregation operation. Moreover, in some examples the time window may comprise a time duration different than a day or a week.

Furthermore, in other examples, in the absence of a specified temporal indicator, the aggregation operation may be executed against a most current portion of source data 520. For example, when source data 520 is collected or updated daily, the aggregation operation may be executed against a portion of source data 520 which has been collected or updated on the same day as the execution of the aggregation operation.

In addition, in some examples data source 515 may comprise a data table having a table identifier. The data table may comprise a column in turn having a column identifier. In some examples the table identifier may comprise a table name and the column identifier may comprise a column name. Moreover, in some examples the source identifier may comprise the table identifier and the column identifier, for example in the format "tablename.columnname".

Furthermore, in some examples data category value 535 may comprise a value from the column of the source data table. Moreover, in some examples the source data table may comprise an additional column, and data category value 535 may further comprise an additional value from the additional column. Examples of such additional values have been described in relation to the methods described herein and FIGS. 1-3.

The example systems described herein may perform method 100 and the other methods and functions described herein, for example in relation to FIGS. 1-3. The example systems may also be used in the context of a DaaS ecosystem, for example as shown in FIG. 4.

Figure 6:
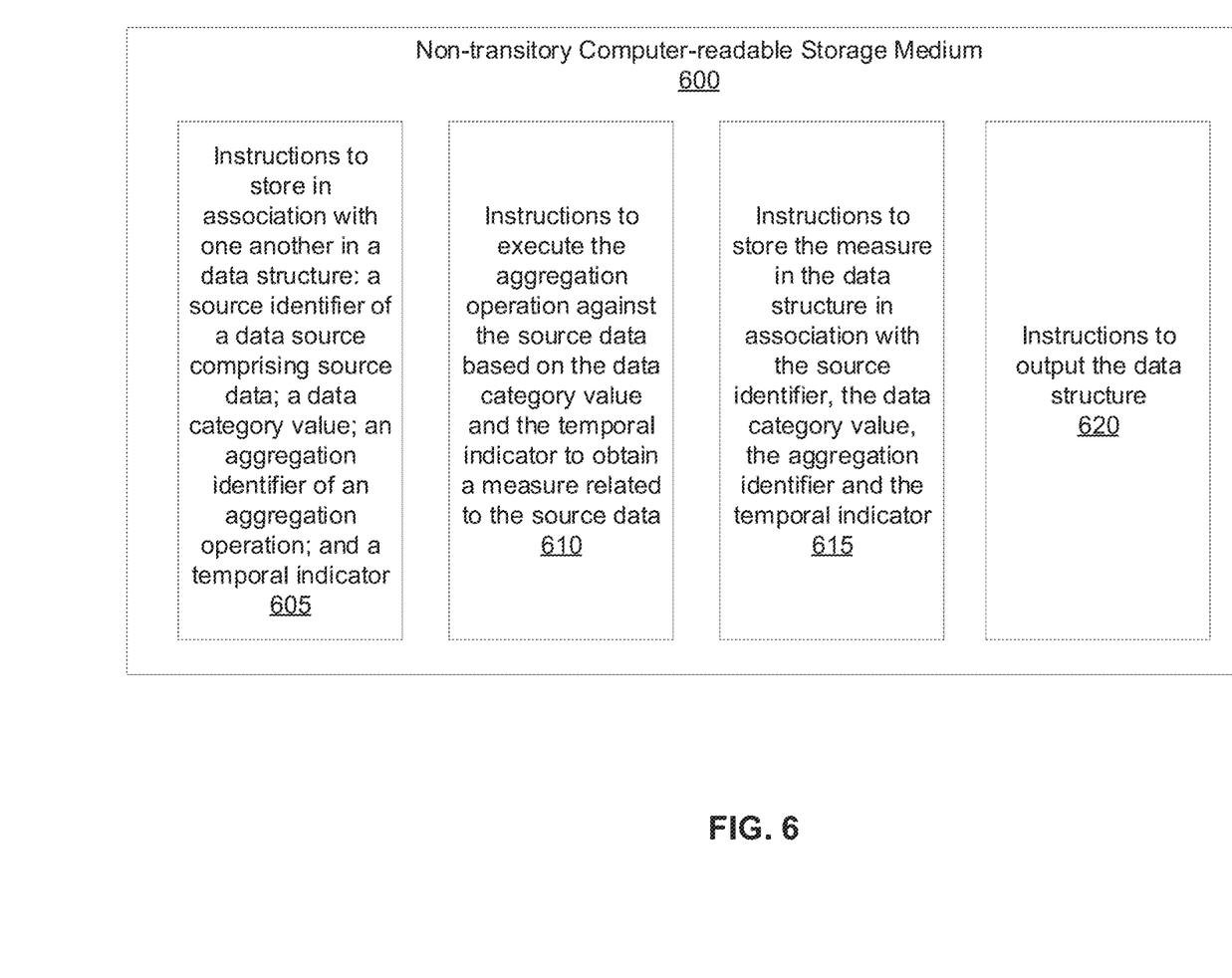
FIG. 6 shows a block diagram of an example computer-readable storage medium.

Turning now to FIG. 6, a non-transitory computer-readable storage medium (CRSM) 600 is shown, which comprises instructions executable by a processor. The CRSM may comprise an electronic, magnetic, optical, or other physical storage device that stores executable instructions. The instructions may comprise instructions 605 to cause the processor to store in association with one another in a data structure: a source identifier of a data source comprising source data, a data category value, an aggregation identifier of an aggregation operation, and a temporal indicator. The source identifier, the data source, the source data, the data category value, the aggregation identifier, the aggregation operation, and the temporal indicator may be similar to those described in relation to the methods and systems described herein and FIGS. 1-5.

CRSM 600 may further comprise instructions 610 to cause the processor to execute the aggregation operation against the source data based on the data category value and the temporal indicator to obtain a measure related to the source data. Moreover, CRSM 600 may comprise instructions 615 to cause the processor to store the measure in the data structure in association with the source identifier, the data category value, the aggregation identifier and/or the temporal indicator, CRSM 600 may also comprise instructions 620 to cause the processor to output the data structure. Executing the aggregation operation to obtain the measure, storing the measure, and outputting the data structure may be similar to the corresponding features and functions described in relation to the methods and systems described herein and FIGS. 1-5.

The five data objects comprising the source identifier, the data category value, the aggregation identifier, the temporal indicator, and the measure may be associated with one another in a manner such that any one of them may link to or otherwise indicate directly or indirectly the other four. For example, they may be stored in a common data structure such as a file.

In some examples the data structure may comprise a table having a row. The five data objects may then be stored in the row of the table, to associate them with one another.

Moreover, in some examples the data source may comprise a data table having a table identifier, and the data table may comprise a column having a column identifier. The source identifier may comprise the table identifier and the column identifier. For example, when the table identifier comprises a table name and the column identifier comprises a column name, the source identifier may be formatted as "tablename.columnname". In addition, in some examples the data category value may comprise a value from the column.

Furthermore, in some examples the temporal indicator may comprise a target date, and the instructions stored in the CRSM may be to cause the processor to execute the aggregation operation against a subset of the source data having an associated date no later than the target date. This may be similar to the corresponding features and functions described in relation to the methods and systems described herein and FIGS. 1-5.

The example CRSMs described herein may also comprise instructions to cause a processor and/or system to perform the methods described herein, to perform the functions demonstrated in FIGS. 1-3, and to be used in the context of a DaaS ecosystem, for example as shown in FIG. 4.

In some examples, the methods, systems, and CRSMs described herein may be implemented using operations, data structures, and/or platforms that are compatible with and/or able to execute SQL queries.

Moreover, the methods, systems, and CRSMs described herein may include the features and/or perform the functions described herein in association with one or a combination of the other methods, systems, and CRSMs described herein.

The methods, systems, and CRSMs described herein may allow for pre-executing and storing aggregate measures, which in turn may reduce the amount of computational resources used to obtain and access such aggregate measures repeatedly. In addition, because the aggregation data structures described herein use simple aggregation operations and data structures that are commonly supported by many data storage and analysis platforms, the aggregation data structures and the corresponding methods, systems, and CRSMs described herein may be portable across and between many different platforms.

In addition, the methods, systems, and CRSMs described herein may allow for obtaining aggregation data structures which may centralize and track a predetermined set of aggregate measures, obtained based on one or multiple data sources, over time. This in turn may facilitate obtaining insights from the source data by allowing a reviewer to refer to one centralized resource, i.e. the aggregation data structure, to review the same or similar aggregation measures over time from one or multiple data sources.

It should be recognized that features and aspects of the various examples provided above may be combined into further examples that also fall within the scope of the present disclosure.

The invention claimed is:

1. A method comprising:
   storing, via a processor of a Device-as-a-Service (DaaS) provider, in a row of a table:
      a source identifier of a data source comprising source data, collected by the DaaS provider, indicating devices managed by the DaaS provider;
      the source identifier identifying: the data source; and an entity to which a device has been provided, or a type of the device;
      a data category value corresponding to a category of the data source;
      an aggregation identifier of an aggregation operation; and
      a temporal indicator comprising a target date;
   executing, via the processor, the aggregation operation against a subset of the source data, based on the data category value and the temporal indicator to obtain a measure related to the source data, the subset having an associated date, no later than the target date, which defines a time period up to which an associated device has been in service, the aggregation operation comprising: a count of devices indicated by the data category value; and an average amount of time in service, of the devices indicated by the data category value, up to the target date;
   storing, via the processor, the measure in the row of the table; and outputting, via the processor, the table by: storing the table to a memory of the DaaS provider; or sending the table to an output terminal, wherein the data source comprises a data table having a table identifier, the data table comprising a column having a column identifier, the data category value comprising a respective value from the column, the data table further comprising an additional column, and the data category value further comprises an additional value from the additional column.

2. The method of claim 1, wherein the source identifier comprises the table identifier, and the source identifier defines the category of the data source, the category comprising the column identifier.

3. The method of claim 1, wherein the aggregation identifier comprises a database query syntax associated with the aggregation operation.

4. A system comprising:
a memory of a Device-as-a-Service (DaaS) provider, the memory to store a data source comprising source data indicating devices managed by the DaaS provider, the source data collected by the DaaS provider;
a processor, of the DaaS provider, the processor in communication with the memory, the processor to:
store in a row of a table:
a source identifier of the data source, the source identifier identifying: the data source; and
an entity to which a device has been provided, or a type of the device;
a data category value corresponding to a category of the data source;
an aggregation identifier of an aggregation operation; and
a temporal indicator comprising a target date;
execute the aggregation operation against a subset the source data based on the data category value to obtain a measure related to the source data, the subset having an associated date, no later than the target date, which defines a time period up to which an associated device has been in service, the aggregation operation comprising: a count of devices indicated by the data category value; and an average amount of time in service, of the devices indicated by the data category value, up to the target date;
store the measure in the row of the table; and
output the table by: storing the table to the memory of the DaaS provider;
or sending the table to an output terminal,
wherein the data source comprises a data table having a table identifier, the data table comprising a column having a column identifier, the data category value comprising a respective value from the column, the data table further comprising an additional column, and the data category value further comprises an additional value from the additional column.

5. The system of claim 4, wherein the source identifier comprises the table identifier, and the source identifier defines the category of the data source, the category comprising the column identifier.

6. A non-transitory computer-readable storage medium comprising instructions executable by a processor of a Device-as-a-Service (DaaS) provider, the instructions to cause the processor to:
store in association with one another in a data structure:
a source identifier of a data source comprising source data, collected by the DaaS provider, indicating devices managed by the DaaS provider;
the source identifier identifying: the data source; and
an entity to which a device has been provided, or a type of the device;
a data category value corresponding to a category of the data source;
an aggregation identifier of an aggregation operation; and
a temporal indicator comprising a target date;
execute the aggregation operation against a subset of the source data based on the data category value and the temporal indicator to obtain a measure related to the source data, the subset having an associated date, no later than the target date, which defines a time period up to which an associated device has been in service, the aggregation operation comprising: a count of devices indicated by the data category value; and an average amount of time in service, of the devices indicated by the data category value, up to the target date;
store the measure in the data structure in association with the source identifier, the data category value, the aggregation identifier and the temporal indicator; and
output the data structure by: storing the data structure to a memory of the DaaS provider; or sending the data structure to an output terminal,
wherein the data source comprises a data table having a table identifier, the data table comprising a column having a column identifier, the data category value comprising a respective value from the column, the data table further comprising an additional column, and the data category value further comprises an additional value from the additional column.

7. The non-transitory computer-readable storage medium of claim 6, wherein
the data table further comprises a row; and
the source identifier, the data category value, the aggregation identifier, the temporal indicator, and the measure are stored in the row of the data table.

8. The non-transitory computer-readable storage medium of claim 6, wherein the source identifier comprises the table identifier, and the source identifier defines the category of the data source, the category comprising the column identifier.

* * * * *